US008858097B2

(12) United States Patent
Hale

(10) Patent No.: US 8,858,097 B2
(45) Date of Patent: Oct. 14, 2014

(54) MINIATURE BALL TRIPOD

(75) Inventor: Eric Hale, San Francisco, CA (US)

(73) Assignee: Daymen US, Inc., Petaluma, CA (US)

( * ) Notice: Subject to any disclaimer, the term of this patent is extended or adjusted under 35 U.S.C. 154(b) by 0 days.

(21) Appl. No.: 13/441,790

(22) Filed: Apr. 6, 2012

(65) Prior Publication Data

US 2012/0269503 A1 Oct. 25, 2012

Related U.S. Application Data

(60) Provisional application No. 61/473,615, filed on Apr. 8, 2011.

(51) Int. Cl.
| G03B 17/00 | (2006.01) |
| F16M 13/00 | (2006.01) |
| G03B 17/56 | (2006.01) |
| F16M 11/14 | (2006.01) |
| F16M 11/38 | (2006.01) |

(52) U.S. Cl.
CPC ............. *F16M 13/00* (2013.01); *G03B 17/561* (2013.01); *F16M 11/14* (2013.01); *F16M 11/38* (2013.01)
USPC ........................................................ 396/428

(58) Field of Classification Search
CPC .................................................... F16M 11/14
USPC ........................................................ 396/428
See application file for complete search history.

(56) References Cited

U.S. PATENT DOCUMENTS

| 2,548,659 | A | * | 4/1951 | Epprecht | 248/181.1 |
| 4,214,724 | A | * | 7/1980 | Geiger | 248/167 |
| 4,648,698 | A | * | 3/1987 | Iwasaki | 248/163.1 |
| 4,886,230 | A | * | 12/1989 | Jones et al. | 248/170 |
| 5,510,863 | A | * | 4/1996 | Kliewer | 396/428 |
| 5,708,890 | A | * | 1/1998 | Nakano | 396/428 |
| 5,772,164 | A | * | 6/1998 | Shen | 248/170 |
| 6,491,266 | B1 | * | 12/2002 | Chen | 248/163.1 |
| 7,290,740 | B2 | * | 11/2007 | Joy et al. | 248/187.1 |
| 7,669,814 | B2 | * | 3/2010 | Bogel | 248/163.1 |
| 2005/0098692 | A1 | * | 5/2005 | Yang | 248/163.1 |
| 2008/0047153 | A1 | * | 2/2008 | Bona et al. | 33/283 |
| 2008/0191105 | A1 | * | 8/2008 | Bogel | 248/170 |
| 2009/0317071 | A1 | * | 12/2009 | David | 396/428 |
| 2010/0042111 | A1 | * | 2/2010 | Qureshi et al. | 606/130 |

OTHER PUBLICATIONS

Leica Lino L2, Accurate, self levelling point and line lasers brochure, Leica Geosystems AG, Art. No. 757225, printed 2010.*

* cited by examiner

*Primary Examiner* — Rodney Fuller
(74) *Attorney, Agent, or Firm* — Michael A. Guth

(57) ABSTRACT

A miniature tripod assembly adapted to mount to the bottom of a camera, or other device, and to be small enough to fit within the profile of the device. The miniature tripod assembly may use a ball joint which allows for multi-axis movement of the device relative to the legs of the tripod.

11 Claims, 6 Drawing Sheets

MINIATURE BALL TRIPOD

CROSS-REFERENCE TO RELATED APPLICATIONS

This application claims priority to U.S. Provisional Patent Application No. 61/473,615 to Hale, filed Apr. 8, 2011, which is hereby incorporated by reference in its entirety.

BACKGROUND

1. Field of the Invention

The present invention relates to a miniature mounting apparatus for cameras, and more specifically to a miniature mounting apparatus with a central joint.

2. Description of Related Art

Typical tripod assemblies consist of three rigid legs which are splayed out to form a support structure for devices such as cameras. The legs are usually rigid and adapted to provide support off of the ground or other flat surface. Some tripods have some adjustment to leg length which may allow for some deviation from flatness in the surface upon which they are mounted. Such tripods also typically are large enough that they are not stored attached to the device, such as a camera, which they are used to support.

What is called for is a miniature tripod small enough to be mounted to the camera and to not interfere with normal use of the camera when the tripod is not used, which is also able pivot around more than one axis.

SUMMARY

The present invention is directed towards a miniature tripod assembly adapted to mount to the bottom of a camera, or other device, and to be small enough to fit within the profile of the device. The miniature tripod assembly may use a ball joint which allows for multi-axis movement of the device relative to the legs of the tripod.

DETAILED DESCRIPTION

Figure 1:
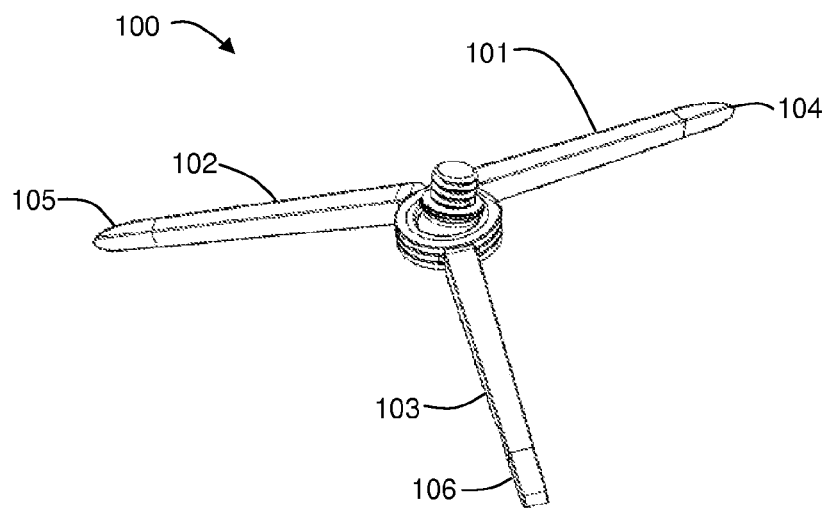
FIG. 1 illustrates a view of a miniature ball tripod in an open configuration according to a first embodiment of the present invention.
Figure 2:
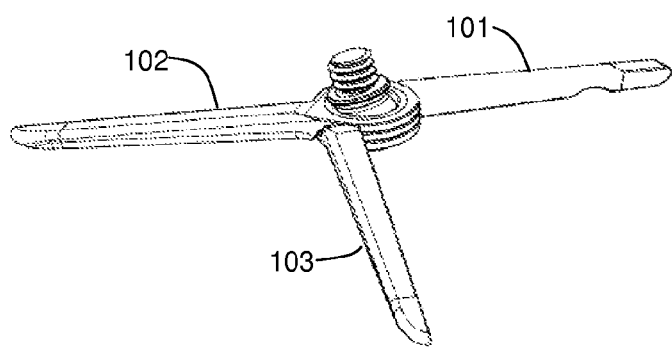
FIG. 2 illustrates a view of a miniature ball tripod in an open configuration according to a first embodiment of the present invention.
Figure 3:
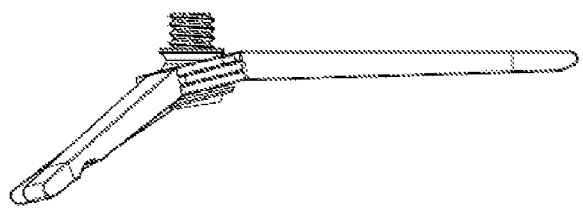
FIG. 3 illustrates a view of a miniature ball tripod in an open configuration according to a first embodiment of the present invention.

In some embodiments of the present invention, as seen in FIGS. 1-6, a miniature ball tripod 100 is adapted to support a device, such as a digital camera. The tripod 100 may be small enough that is it able to mount fully within the bottom envelope of the device. In some embodiments, the tripod legs 101, 102, 103 are adapted to rotate from a first position 113, which is a closed, or stowed, configuration and seen in FIGS. 4, 5, and 6, to an open, or deployed, position as seen in FIGS. 1, 2 and 3. In some embodiments, the tripod legs 101, 102, 103 may have tips 104, 105, 106 which may be of a material adapted to provide more friction while in use.

In some embodiments, the stowed position 113 places the legs 101, 102, 103 directly adjacent such that they are stowed together into a unitary stowed leg assembly. The rings 111 of the ends of the legs 101, 102, 103 may be adapted such that when in a deployed position the rings 111 have stops which prevent further rotation of the legs past a point which places the legs 101, 102, 103 in a tripod configuration.

Figure 4:
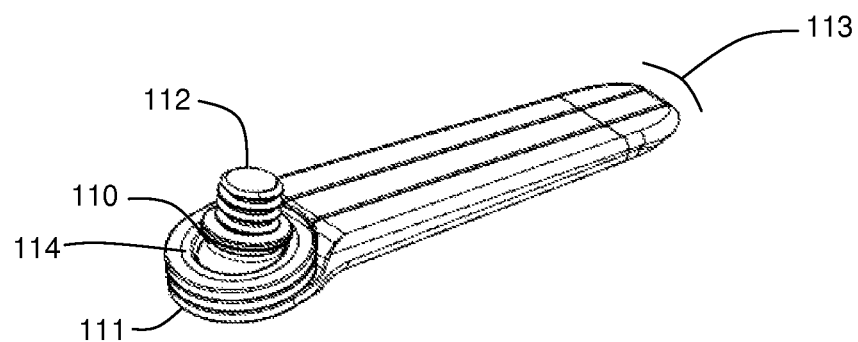
FIG. 4 illustrates a view of a miniature ball tripod in a closed configuration according to a first embodiment of the present invention.
Figure 5:
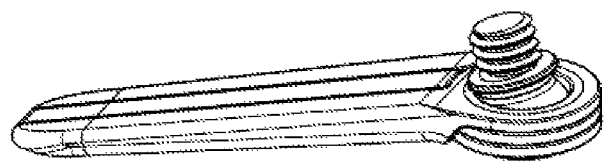
FIG. 5 illustrates a view of a miniature ball tripod in a closed configuration according to a first embodiment of the present invention.
Figure 6:
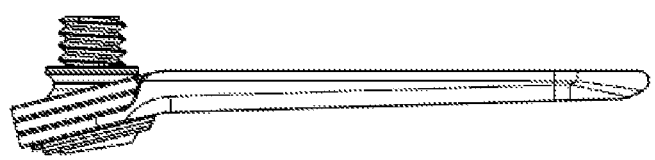
FIG. 6 illustrates a view of a miniature ball tripod in a closed configuration according to a first embodiment of the present invention.

As seen if FIG. 4, a central body ring 114 provides an external surface adapted to provide a support and guide surface to the ends of the legs, which may be rings 111 adapted to fit around the central body ring. Within the central body ring 114 there may be a socket adapted to receive a ball connector 110. The ball connector 110 may be spherical in its contact area with the socket. A threaded post 112 may protrude from the ball connector 110 and be adapted to support a device such as a camera. The rings 111 of the legs 101, 102, 103 may have sufficient friction with the central body ring 114 such that the legs 101, 102, 103 may be rotated into either a stowed or a deployed configuration, but will stay in the position under typical usage loads. The ball connector 110 may have sufficient friction with the socked of the interior of the central body ring such that once placed in a selected position the ball tends not to move during typical use.

Figure 7:
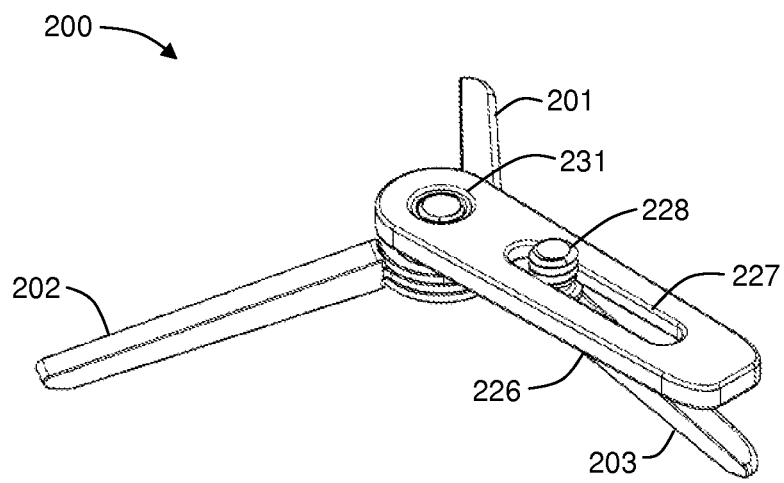
FIG. 7 illustrates a view of a miniature ball tripod in an open configuration according to a second embodiment of the present invention.
Figure 8:
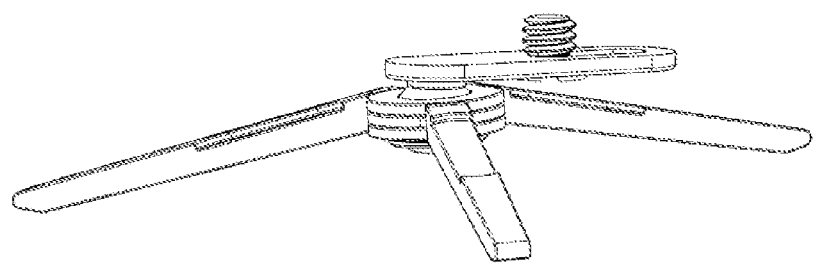
FIG. 8 illustrates a view of a miniature ball tripod in an open configuration according to a second embodiment of the present invention.

In some embodiments of the present invention, as seen in FIGS. 7 and 8, the tripod 200 may have an additional interface portion 226. The tripod 200 and its legs 201, 202, 203 may have an interface portion 226 with a threaded receiver 231 adapted to fasten to the ball connector. A slot 227 in the interface portion allows a fastener 226 to be moved along the interface portion 226, which in turn allows a camera, or other device, fastened to the fastener 226 to be positioned in a variety of positions along the length of the slot 227.

Figure 9:
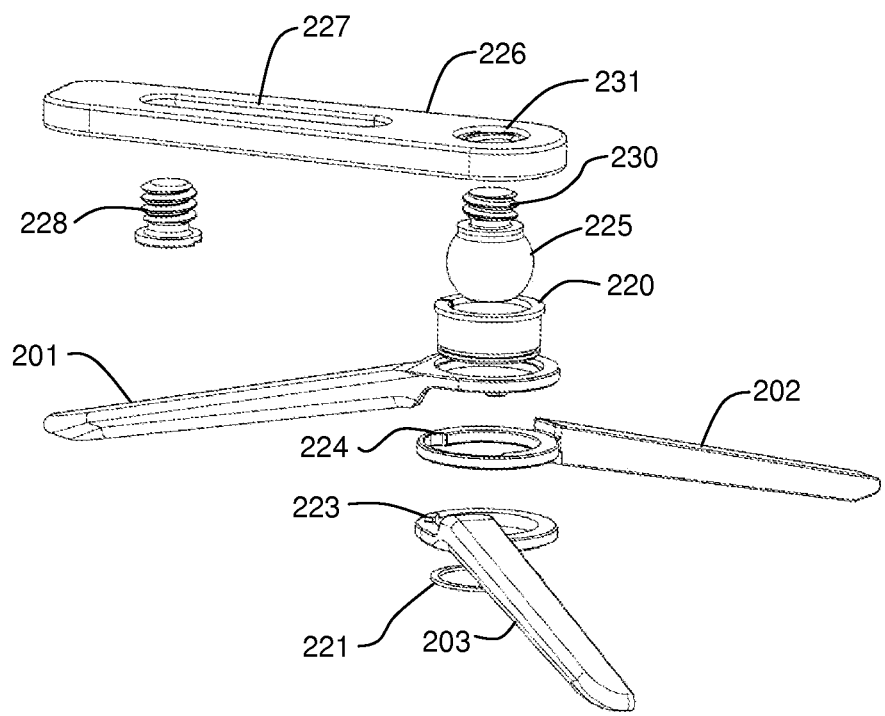
FIG. 9 illustrates an exploded view of a miniature ball tripod according to a second embodiment of the present invention.

FIG. 9 is an exploded view illustrating aspects of a miniature ball tripod according to some embodiments of the present invention. The legs 201, 202, 203 are substantially linear extending towards their feet, which may have a frictional compound in order to enhance grip of the foot of a leg while in use. The other end of the legs may comprise a ring. The three rings of the three legs are adapted to fit around, and to rotate around, the exterior of the central body ring 220. The central body ring 220 may have a flange on one end adapted to restrain the rings axially along the outside of the central body ring 220. A restraining ring 221 may be used to restrain the rings of the legs in the other direction, and may be threaded, or bonded, to the central body ring 220. The interior of the central body ring 220 is adapted to receive the ball connector 225. All or part of the interior of the central body ring 220 may be of a spherical profile in some embodiments. The central ball connector 225 may be adapted to be pressed into the central body ring 225. This may be done prior to the mounting of the legs to the assembly to allow for some deflection of the central body ring 220 during the installation of the ball connector 225. The ball connector 225 may have a threaded feature 230 adapted for use to be threaded directly into a camera, or into an additional interface portion, as described above. The rings of the legs may have locking features 223, 224 adapted to constrain the rotation of the rings around the central body ring so that as one rotates the legs from the stowed to the deployed position, the legs lock in the appropriate locations.

Figure 10:
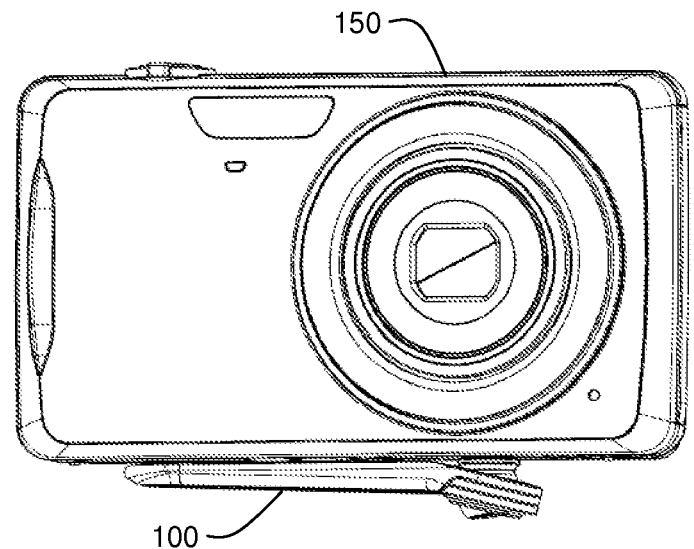
FIG. 10 is an illustration of a camera with a miniature ball tripod in a stowed position according to some embodiments of the present invention.
Figure 11:
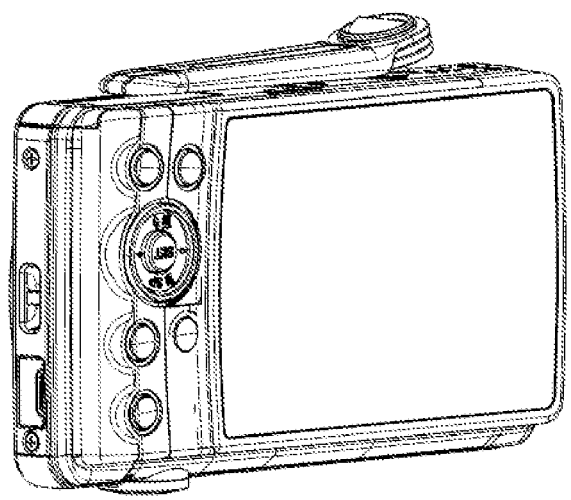
FIG. 11 is an illustration of a camera with a miniature ball tripod in a stowed position according to some embodiments of the present invention.

FIGS. 10 and 11 illustrate a miniature ball tripod 100 with a camera 150 mounted thereon. As seen, the tripod is adapted to stow with its legs together and also under the camera such that it does not protrude around the perimeter of the bottom of the camera. In some embodiments, the friction between the ball connector and the central body ring is such that the stowed tripod will not be susceptible to moving easily away from the camera during normal handling, enhancing the aspect relating to its non-intrusive nature. The ball aspect of the central joint allows for the stowage of the legs directly against the bottom of the camera if desired, reducing the stowed profile of the system and also reducing the chance of the legs of the tripod becoming caught on objects while stowed.

Figure 12:
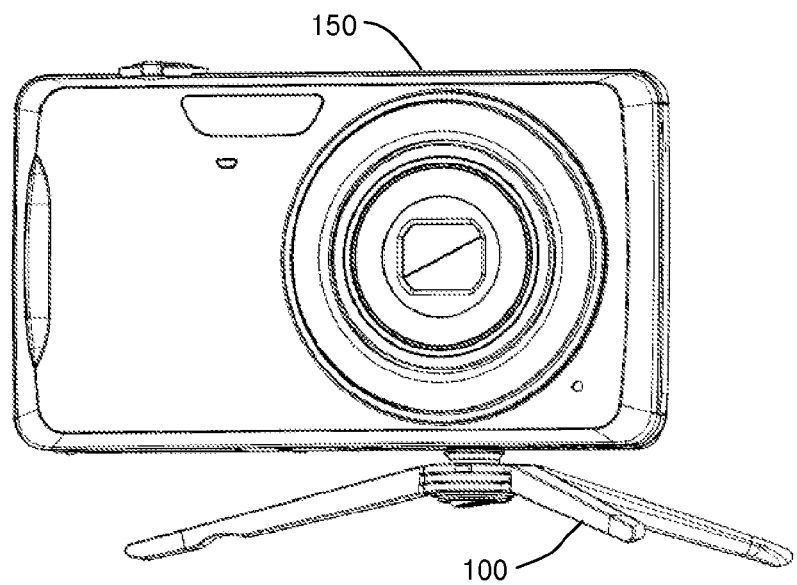
FIG. 12 is an illustration of a camera with a miniature ball tripod in an open position according to some embodiments of the present invention.
Figure 13:
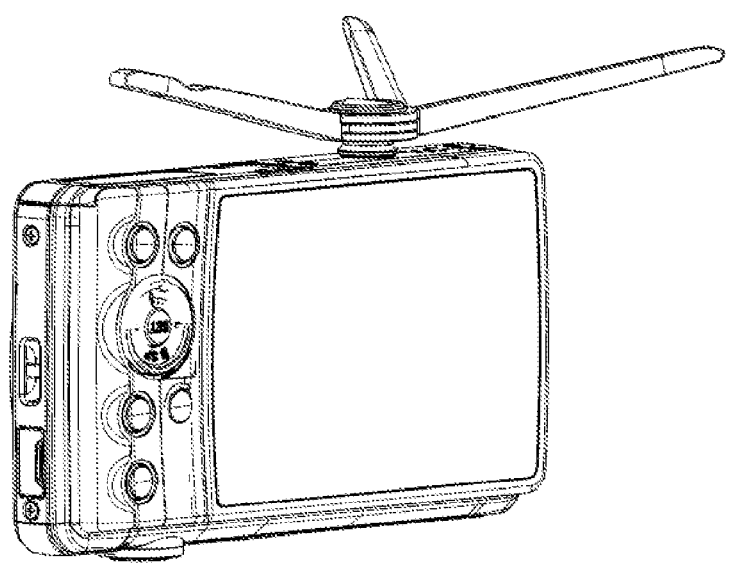
FIG. 13 is an illustration of a camera with a miniature ball tripod in an open position according to some embodiments of the present invention.

FIGS. 12 and 13 illustrate a miniature ball tripod 100 with a camera 150 mounted thereon. The camera may be set upon a surface such that the tripod allows the user to frame a shot, and then to not continue to hold the camera.

The miniature ball tripod may be joined to a camera, and the camera can be used without the tripod interfering with the normal operation of the camera. Then, should the tripod be desired to be used, the legs may be moved from the stowed to the deployed position, and the camera may be used with the tripod.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. A miniature ball tripod comprising:
   a central body ring having a central axis, said central body ring comprising
      an internal socket for a ball connector, and
      a top and a bottom; and
      a cylindrical exterior;
      a ball connector, said ball connector comprising an attachment portion, said ball connector residing within said internal socket of said central body ring, wherein the widest diameter of said ball connector resides between said top and said bottom of said central body ring; and
   three legs, said legs comprising a first end and a second end, said first end of said legs connected around said cylindrical exterior of said central body ring,
   wherein said internal socket for a ball connector is co-located along said axis where said legs are connected around the cylindrical exterior of the central body ring portion.

2. The miniature ball tripod of claim 1 wherein each of said legs is adapted to rotate around said cylindrical exterior of said central body ring.

3. The miniature ball tripod of claim 2 wherein said legs are adapted to rotate from a first position wherein all three legs are adjacently packed to a second position wherein said legs are equally spaced around said central body ring.

4. The miniature ball tripod of claim 1 wherein said ball connector is adapted to pivot within said internal socket of said central body ring in two axes.

5. The miniature ball tripod of claim 4 wherein each of said legs is adapted to rotate around said cylindrical exterior of said central body ring.

6. The miniature ball tripod of claim 5 wherein said legs are adapted to rotate from a first position wherein all three legs are adjacently packed to a second position wherein said legs are equally spaced around said central body ring.

7. The miniature ball tripod of claim 6 wherein said attachment portion comprises a externally threaded protrusion protruding from said ball connector.

8. A camera and tripod system, said system comprising:
   a camera, said camera comprising a mounting interface along a bottom surface; and
   a miniature ball tripod, said miniature ball tripod comprising:
      a central body ring having a central axis, said central body ring comprising
         an internal socket for a ball connector, and
         a top and a bottom; and
         a cylindrical exterior;
      a ball connector, said ball connector comprising an attachment portion attached to said mounting interface of said camera, said ball connector adapted to reside within said internal socket of said central body ring;
      three legs, said legs comprising a first end and a second end, said first end of said legs connected around said central body ring,
   wherein said internal socket for a ball connector is co-located along said axis where said legs are connected around the cylindrical exterior of the central body ring portion.

9. The miniature ball tripod of claim 8 wherein each of said legs is adapted to rotate around said central body ring.

10. The miniature ball tripod of claim 9 wherein said legs are adapted to rotate from a first position wherein all three legs are adjacently packed to a second position wherein said legs are equally spaced around said central body ring.

11. The miniature ball tripod of claim 8 wherein said ball connector is adapted to pivot within said socket of said central body ring in two axes.

* * * * *